United States Patent [19]

Howland

[11] Patent Number: 5,107,686
[45] Date of Patent: Apr. 28, 1992

[54] COMPARTMENTALIZED TRANSPORT REFRIGERATION SYSTEM

[75] Inventor: Leland L. Howland, Belle Plaine, Minn.

[73] Assignee: Thermo King Corporation, Minneapolis, Minn.

[21] Appl. No.: 646,926

[22] Filed: Jan. 28, 1991

[51] Int. Cl.⁵ .................... F25B 41/00; F25B 13/00
[52] U.S. Cl. ................................. 62/160; 62/196.4; 62/199
[58] Field of Search .............. 62/160, 278, 196.4, 62/200, 199, 324.1, 324.5, 324.6

[56] References Cited

U.S. PATENT DOCUMENTS

| | | | |
|---|---|---|---|
| 4,122,686 | 10/1978 | Lindahl et al. | 62/278 X |
| 4,419,866 | 12/1983 | Howland | 62/228.4 |
| 4,685,306 | 8/1987 | Howland et al. | 62/117 |
| 4,706,468 | 11/1987 | Howland et al. | 62/199 |
| 4,711,095 | 12/1987 | Howland et al. | 62/117 |
| 4,712,383 | 12/1987 | Howland et al. | 62/200 |
| 4,819,441 | 4/1989 | Hanson | 62/160 |
| 4,896,512 | 1/1990 | Howland | 62/117 |
| 4,932,219 | 6/1990 | Howland et al. | 62/174 |

FOREIGN PATENT DOCUMENTS 988874 4/1965 United Kingdom .

Primary Examiner—Harry B. Tanner
Assistant Examiner—John Sollecito
Attorney, Agent, or Firm—D. R. Lackey

[57] ABSTRACT

A transport refrigeration system including host and remote refrigeration systems having local and remote evaporators, respectively, for respectively controlling the temperatures of first and second compartments via cooling and hot gas heating cycles. The host and remote refrigeration systems each have a plurality of controllable valves, including a controllable valve in their respective suction lines, and they each have a suction line to liquid line refrigerant by-pass lines, enabling either the host or remote evaporator to function as a condenser for the other, while by passing the normal condenser function, and further enabling either evaporator to control to a lower temperature than the other, as desired.

2 Claims, 3 Drawing Sheets

COMPARTMENTALIZED TRANSPORT REFRIGERATION SYSTEM

TECHNICAL FIELD

The invention relates to transport refrigeration systems for trailers having more than one compartment to be conditioned.

BACKGROUND ART

My U.S. Pat. No. 4,896,512, which is assigned to the same assignee as the present application, improves upon the efficiency of a compartmentalized, multi-temperature transport refrigeration system by causing a remote evaporator requiring heat to function as a condenser for an evaporator requiring cooling. Thus, instead of rejecting heat in the normal condenser function, the normal condenser is by-passed. Hot gas leaving the compressor discharge port is directed into a remote evaporator requiring heat, and the refrigerant leaving the remote evaporator is directed to the host liquid line, eg., the receiver. The refrigerant then proceeds to the evaporator which requires cooling.

While this arrangement greatly facilitates a heating cycle in a remote compartment, without the necessity of employing costly induction alternators to power electrical resistors, the arrangement is somewhat inflexible, as the host evaporator must always serve as the low temperature compartment. In other words, a frozen cargo or load must always be placed in a compartment directly adjacent to the host refrigeration unit, and a fresh load must always be in a remote compartment.

It would be desirable, and it is an object of the present invention, to increase the flexibility of a compartmentalized, multi-temperature transport refrigeration system, without the necessity of requiring auxiliary electrical power and associated resistors.

DISCLOSURE OF THE INVENTION

Briefly, the present invention is an improvement upon my aforesaid U.S. Pat. No. 4,896,512, enabling a compartmentalized, multi-temperature transport refrigeration system to operate with any compartment as the low temperature compartment, and enhancing the hot gas heating efficiency of any compartment by allowing the evaporator requiring heat to function as a condenser for an evaporator requiring a cooling cycle. I have found that this increased flexibility and efficiency may be achieved at very little additional equipment cost, compared with the equipment of my aforesaid patent, requiring only the addition of a solenoid valve in the host suction line, a unidirectional host suction line to host liquid line bypass, a check valve in the host suction line, and an additional heat lock-out relay in the electrical control.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
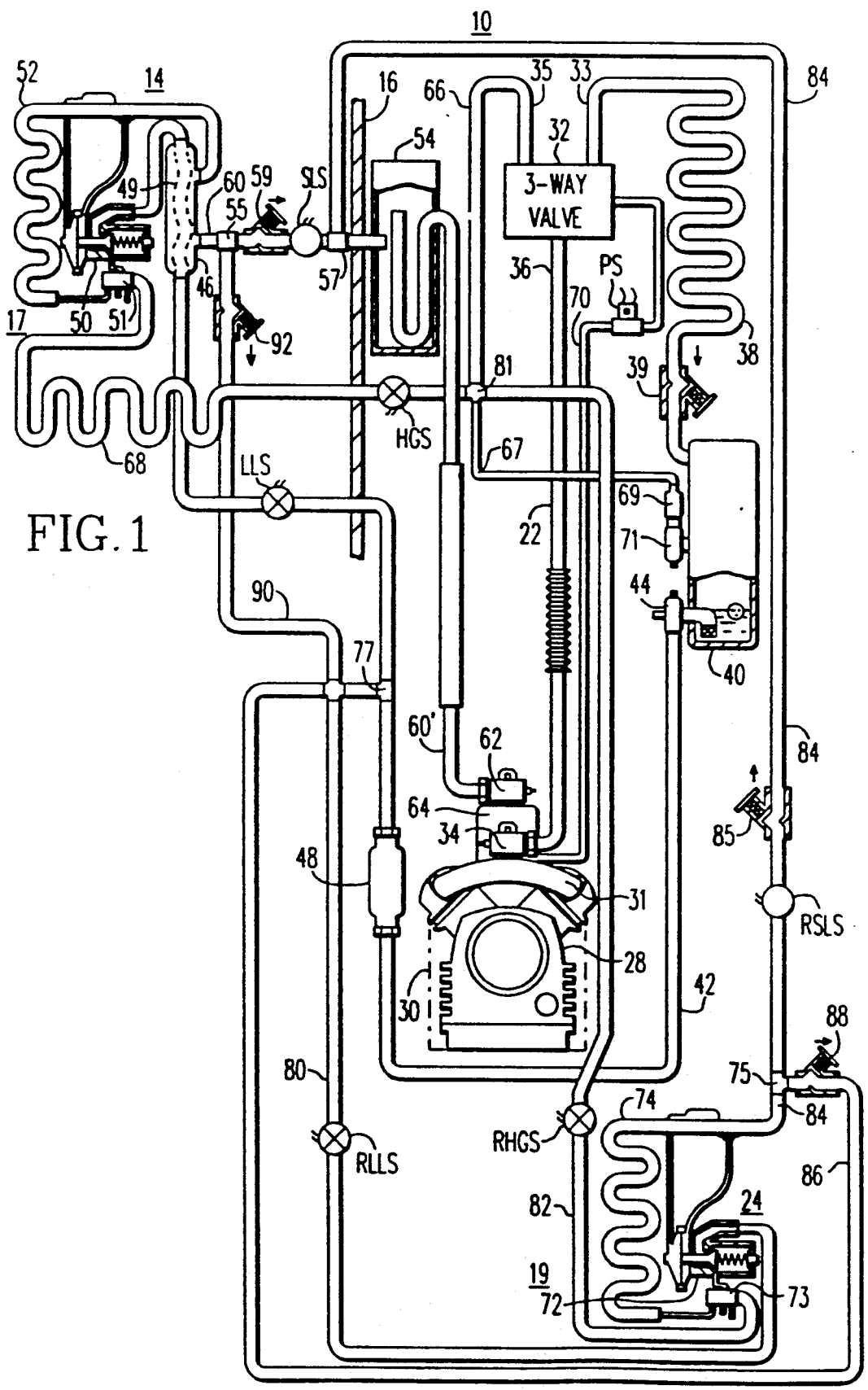
FIG. 1 illustrates a refrigerant piping diagram of a compartmentalized, multi-temperature refrigeration system having host and remote refrigeration units constructed according to the teachings of the invention.

The hereinbefore mentioned U.S. Pat. No. 4,896,512 is hereby incorporated into the specification of the present application by reference. Components in the present application which may be the same as in the incorporated application will be referred to with the same reference numerals.

Referring now to the drawings, and to FIG. 1 in particular, there is shown a schematic piping diagram of a compartmentalized, multi-temperature transport refrigeration system 10. System 10 is associated with a trailer 16 having first and second compartments 17 and 19, respectively, to be conditioned. System 10 is under the control of a temperature controller 12, shown in FIG. 2, with controller 12 having temperature sensors 18 and 20 respectively disposed in compartments 17 and 19.

Transport refrigeration system 10 includes a host refrigeration unit 14 which is controlled in response to sensor 18, a remote refrigeration unit 24 which is controlled in response to sensor 20, and refrigerant piping between the two units. FIG. 1 also illustrates a plurality of controllable solenoid valves having open and closed positions, and check valves. While the solenoid valves will be referred to as having a specified normal de-energized position, it will be understood that the opposite de-energized position may be used by merely modifying the associated control 12 accordingly.

The host refrigeration unit 14 includes closed fluid circuits which include a refrigerant compressor 28 driven by a prime mover such as an internal combustion engine, indicated generally by broken outline 30. Discharge ports 31 of compressor 28 are connected to a refrigeration circuit selecting valve means 32 via a discharge service valve 34 and a hot gas line 36. Valve means 32 may be a three-way valve, as illustrated, or two separate valves, as desired. For the purposes of this description, valve means 32 will be referred to as a three-way valve.

Three-way valve 32 is controlled by a pilot solenoid valve PS. When pilot solenoid valve PS is deenergized, three-way valve 32 is biased to a position which directs hot gas from compressor 28 into a first refrigerant circuit 33. When pilot solenoid valve PS is energized, compressor pressure via conduit 70 operates three-way valve 32 to a position which directs hot gas from compressor 28 into a second refrigerant circuit 35. The first refrigerant circuit 33 directs refrigerant in a closed loop which includes a condenser 38, a check valve 39, a receiver 40, a liquid line 42, a drier 48, a normally closed, liquid line solenoid valve LLS, a first path through a heat exchanger 46, an expansion valve 50, a distributor 51, an evaporator 52, a second path through heat exchanger 46, a suction line 60 which extends to an accumulator 54, and a suction line 60' which extends from the accumulator 54 to the suction port of compressor 28 via a suction line service valve 62 and a suction throttling valve 64. Accumulator 54 is not essential and may be eliminated. The use of accumulator 54 assures vaporized refrigerant for compressor 28 in systems and/or ambients where slugging may be a problem.

The suction line 60 is modified according to the teachings of the invention to include a tee 55, a check valve 59, a normally open suction line solenoid valve SLS, and a tee 57.

The first refrigerant circuit 33 is the normal cooling circuit for the host refrigeration unit 14, removing heat from the first trailer compartment 17 associated with host evaporator 52 and temperature sensor 18, and rejecting heat in condenser 38 to ambient.

When host or local evaporator 52 requires heat for defrosting, or for holding a selected set point temperature, as detected by sensor 18, controller 12 energizes the pilot solenoid valve PS. Pressure from compressor 28 now operates three-way valve 32, and valve 32 then directs hot compressor gas to the second refrigerant circuit 35. The second refrigerant circuit 35 includes hot gas line 66, a normally closed hot gas solenoid valve HGS, a defrost pan heater 68, distributor 51, evaporator 52, the second path through heat exchanger 46, accumulator 54, and back to compressor 28 via suction line 60 and 60'. A receiver pressurizing tap 67 extends from hot gas line 66 to receiver 40 via a check valve 69 and service valve 71.

The remote refrigeration unit 24 includes an expansion valve 72, a distributor 73 and an evaporator 74. Expansion valve 72 is connected to liquid line 42, between drier 48 and liquid line solenoid valve LLS, via a tee 77 and a remote liquid line 80 which includes a normally closed remote liquid line solenoid valve RLLS. Distributor 73 is connected to hot gas line 66 via a tee 81 and a remote hot gas line 82 which includes a normally closed remote hot gas line solenoid valve RHGS. The outlet of remote evaporator 74 is connected to a suction line 84 which includes a tee 75, and the remote suction line 84 continues from tee 75, returning to the suction port of compressor 28 via tee 57 in host suction line 60. The remote suction line 84 between tee 75 and tee 57 includes a suction line check valve 85 and a normally open remote suction line solenoid valve RSLS.

The remaining outlet of tee 75 is connected to the host liquid line via a check valve 88, such as to the inlet of receiver 40 as shown in the incorporated patent, or, as illustrated, via a by-pass line or conduit 86 to tee 77 in host liquid line 42. The illustrated suction line to liquid line by-pass more advantageously returns refrigerant directly to liquid line 42, rather than to the receiver 40. This preferred arrangement is shown in U.S. Pat. No. 4,932,219, which patent is assigned to the same assignee as the present application. The illustrated arrangement is preferred because line 86 does not have to be run all the way back to the receiver 40, located in the host unit 14, and because refrigerant enters an active refrigerant circuit faster than returning it to the receiver.

According to the teachings of the invention, a unidirectional by-pass line or conduit 90 extends from tee 55 in the host suction line 60 to tee 77 in the host liquid line 42 via a check valve 92.

Figure 2:
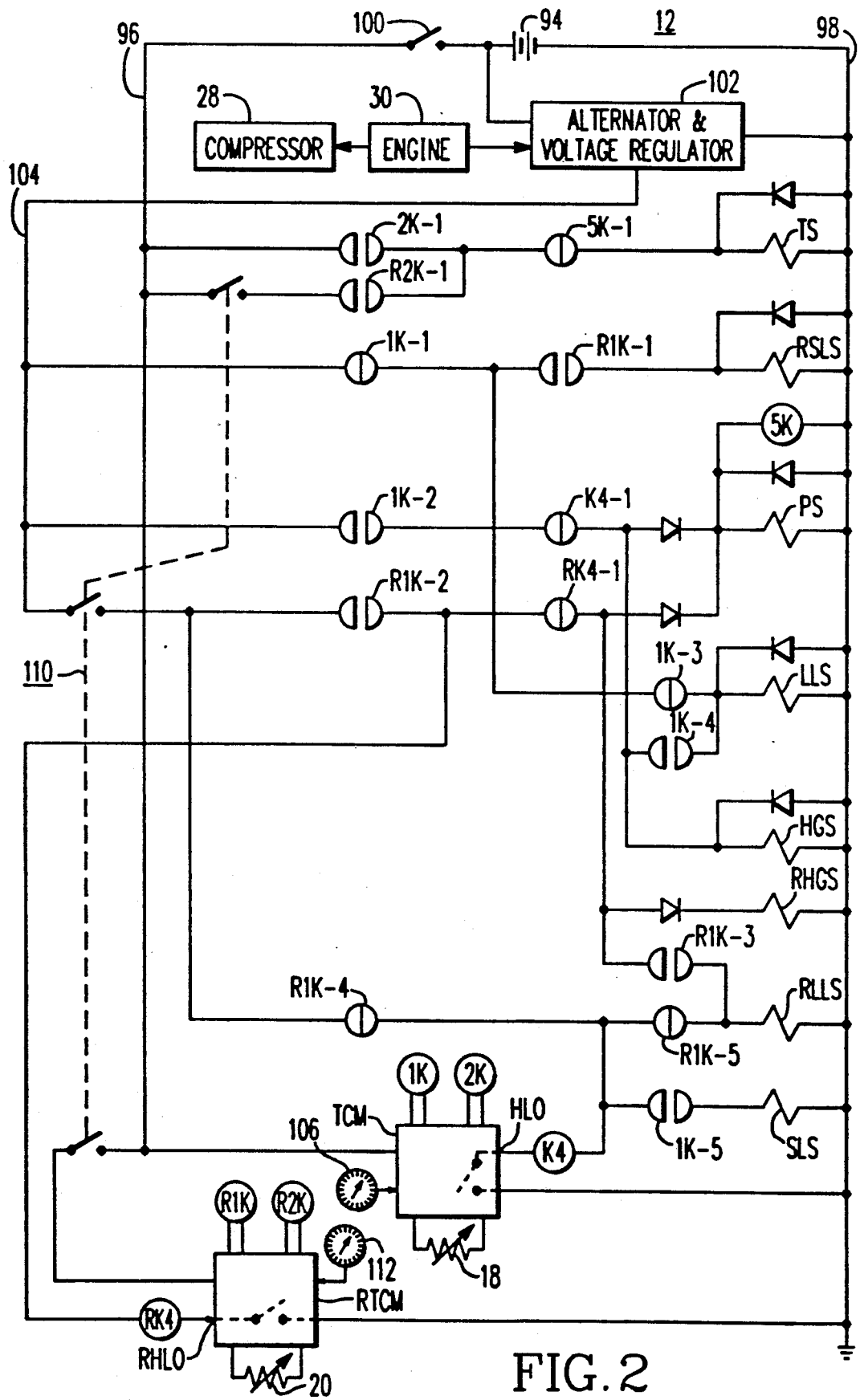
FIG. 2 is a schematic diagram of electrical control for operating the refrigeration system of FIG. 1 according to the invention.

FIG. 2 is a schematic diagram of certain of the control elements of controller 12, which are essential to understanding the operation of the refrigeration system 10. A battery 94 is connected to conductors 96 and 98 via an on-off switch 100. Conductor 98 is a grounded conductor. An alternator and voltage regulator 102 are connected across battery 94, and they provide a regulated voltage from a conductor 104 to the grounded conductor 98 when the prime mover 30 is operative.

Host unit 14 includes a thermostatic control module TCM connected between conductors 96 and 98. Control module TCM includes the hereinbefore mentioned temperature sensor 18 disposed in the space or compartment 17 served by host unit 14, a heat relay 1K, a speed relay 2K and a contact HLO which is connected to system ground 98 when a host set point selector 106 is set below a predetermined temperature indicative of a frozen cargo in the first compartment 17.

Figure 3:
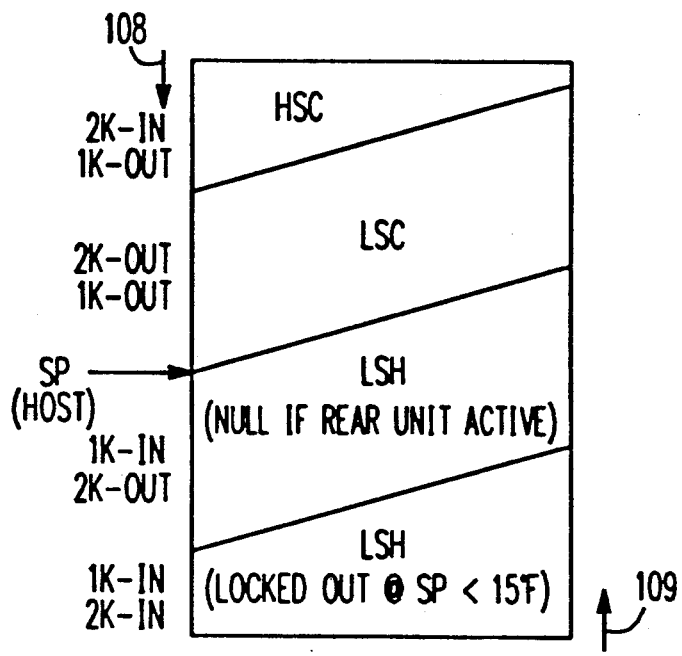
FIG. 3 is a diagram which illustrates various combinations of heat and speed relays associated with a host thermostat, and the resulting operating modes of the host refrigeration unit.

FIG. 3 is a chart which illustrates the various modes selectable by the heat and speed relays 1K and 2K, with a falling temperature being indicated by arrow 108 along the left-hand side of the chart, and with a rising temperature being indicated by arrow 109 along the right-hand side of the chart. For example, when the speed relay is "in" (energized) and the heat relay is "out" (de-energized), the host unit 14 will be in a high speed cool (HSC) mode. When the temperature in the served space 17 drops closer to set point SP, both the heat and speed relays 1K and 2K will be out and the host unit 14 will switch to a low speed cool (LSC) mode. When the temperature has been pulled down to set point SP, the heat relay 1K picks up and the speed relay 2K will be out, which causes the host unit 14 to operate in a low speed heat (LSH) mode, if the remote unit 24 is not active. The host unit 14 will go into a null or satisfied mode, neither requiring heating nor cooling, when the remote unit 24 is active, ie., either heating or cooling. Should the temperature in the served compartment 17 drop to a predetermined value below set point SP, ie., a temperature indicative of a frozen load, such as −15 degrees F., for example, then heat will be locked out. If heat is not locked out by the set point setting, the host system will operate in low speed heat. If heat is locked out, the system will be in null if the remote system 24 is active, and otherwise it will be in low speed cool mode or cycle in a continuously operated system, ie., the prime mover 30 operates continuously. In a start-stop system, such as disclosed in U.S. Pat. No. 4,419,866, which is assigned to the same assignee as the present application, when both the host and remote systems are satisfied, the system 10 would shut down until re-started by one of the refrigeration systems coming out of "null".

The remote unit 24 includes a thermostat control module RTCM connected between conductors 96 and 98 via a switch 110. Switch 110 is manually closed when the remote unit 24 is to be activated. Remote control module RTCM includes the hereinbefore mentioned temperature sensor 20 disposed in the space or compartment 19 served by remote unit 24, a heat relay R1K, a speed relay R2K and a contact RHLO which is connected to system ground 98 when a remote set point selector 112 is set below a predetermined temperature indicative of a frozen cargo in the first compartment 17.

Figure 4:
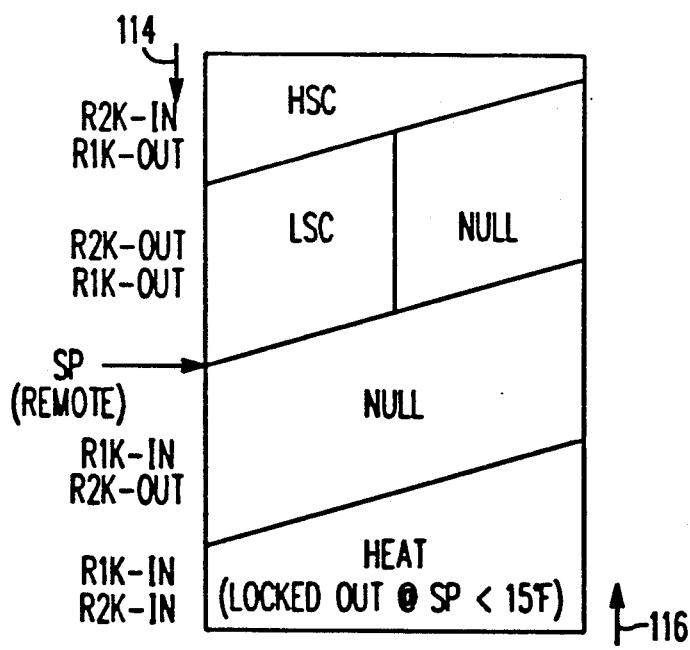
FIG. 4 is a diagram which illustrates various combinations of heat and speed relays associated with a remote thermostat, and the resulting operating modes of the remote refrigeration unit.

FIG. 4 is a chart which illustrates the various modes selectable by the heat and speed relays R1K and R2K, with a falling temperature being indicated by arrow 114 along the left-hand side of the chart, and with a rising temperature being indicated by arrow 116 along the right-hand side of the chart. For example, when the speed relay R1K is "in" (energized) and the heat relay R2K is "out" (de-energized), the remote unit 14 will be in a high speed cool (HSC) mode. When the temperature in the served space 19 drops closer to set point SP, both the heat and speed relays R1K and R2K will be out and the host unit 14 will switch to a low speed cool (LSC) mode. When the temperature has been pulled down to set point SP, the heat relay R1K picks up and the speed relay R2K will still be out, which causes the remote unit 24 to go into null. Should the temperature continue to drop below set point, both the heat and speed relays R1K and R2K will be energized and the system will go into a heating mode, unless locked out from going to a heating mode by the hereinbefore mentioned low setting of set point selector 112. During a rising temperature, when the temperature rises above set point, the null mode continues above set point until reaching high speed cool (HSC).

A throttle solenoid TS is connected between conductors 96 and 98 via normally open contacts 2K-1 of the host speed relay 2K and normally closed contacts 5K-1 of a relay 5K which is energized during a heating mode to prevent, in the exemplary embodiment, a high speed heating mode. Normally open contacts R2K-1 of the remote speed relay R2K and remote switch 110 are connected across contacts 2K-1. Thus, either the host or remote systems 14 or 24 can initiate a high speed cooling mode. Throttle solenoid TS is connected to the throttle on engine 30 via a suitable linkage, such that when TS is energized the engine operates at a predetermined elevated speed, such as 2200 RPM, and when it is de-energized it operates the engine at a predetermined lower speed, such as 1400 RPM.

The remote suction line solenoid valve RSLS is connected between conductors 104 and 98 via normally closed contacts 1K-1 of the host heat relay 1K and normally open contacts R1K-1 of the remote heat relay R1K-1. Thus, when the host unit 14 is in a cooling mode and the remote unit 24 is in a heating mode, valve RSLS will close, which, along with other valve operations, will cause the remote evaporator 74 to function as a condenser for the host evaporator, adding additional heating capacity to the remote heating function.

The pilot solenoid PS is connected to be energized via a first circuit between conductors 104 and 98 which includes normally open contacts 1K-2 of the host speed relay 1K and normally closed contacts K4-1 of a host heat lock-out relay K4. Relay K4 is energized when host heating should be locked out. Pilot solenoid PS is connected to be energized via a second circuit between conductors 104 and 98 which includes remote switch 110, normally open contacts R1K-2 of the remote heat relay R1K and a normally closed contact RK4-1 of a remote heat lock-out relay RK4 which is energized when remote heating should be locked out. The hereinbefore mentioned relay 5K is connected across the pilot solenoid PS and is thus energized when pilot solenoid is operated to switch three-way valve 32 to select circuit 35, associated with a heating cycle in one of the evaporators.

The host liquid line solenoid LLS is connected between conductors 104 and 98 via a first circuit which includes the hereinbefore mentioned normally closed contact 1K-1 of the host speed relay and normally closed contacts 1K-3 of the host speed relay; and, via a second circuit which includes the hereinbefore mentioned contacts 1K-2 and K4-1, and normally open contacts 1K-4 of the host speed relay.

The hot gas solenoid HGS is connected between conductors 104 and 98 via a circuit which includes the hereinbefore mentioned contacts 1K-2 and K4-1.

The remote hot gas solenoid RHGS is connected between conductors 104 and 98 via a circuit which includes the hereinbefore mentioned remote switch 110, contacts R1K-2 and contacts RK4-1.

The remote liquid line solenoid RLLS is connected to be energized via a first circuit which includes the hereinbefore mentioned remote switch 110, contacts R1K-2, contacts RK4-1 and normally open contacts R1K-3 of the remote heat relay R1K; and, via a second circuit which includes the remote switch 110, normally closed contacts R1K-4 of the remote speed relay R1K, and normally closed contacts R1K-5 of the remote speed relay R1K.

The host suction line solenoid SLS is connected between conductors 104 and 98 via the hereinbefore mentioned contacts R1K-4 and normally open contact 1K-5 of the host speed relay. Thus, when the remote unit 24 is in a cooling mode and the host unit 14 is in a heating mode, valve SLS will close, which, along with other valve operations, will cause the host evaporator 52 to function as a condenser for the remote evaporator 74, adding additional heating capacity to the host heating function.

The host heat lock-out relay K4 is connected to be energized by remote switch 110 and the hereinbefore mentioned contact R1K-4 and by terminal HLO, when terminal HLO is connected to ground 98 by the preselected low setting of set point selector 106.

The remote heat lock-out relay RK4 is connected to be energized by the remote switch 110, the hereinbefore mentioned contact R1K-2, and by terminal RHLO, when terminal RHLO is connected to ground 98 by the preselected low setting of set point selector 112.

When the remote evaporator 74 requires a heating cycle and the host evaporator 52 requires a cooling cycle, pilot solenoid PS is energized, switching three-way valve 32 to refrigeration circuit 35, valve HGS is closed, valve RHGS is open, valve RSLS is closed, valve LLS is open, and valve SLS is open. The refrigerant flow path includes host hot gas line 36, a portion of host hot gas line 66, remote hot gas line 42, remote evaporator 74, the by-pass line or conduit 86 which includes check valve 88, a portion of the host liquid line 42, host expansion valve 50, distributor 51, host evaporator 52, host suction line 60, accumulator 54, and host suction line 60'. The normal condenser function 38 is by-passed, with the heat picked up in the cooling host evaporator 52 being added to the heating of the remote evaporator 74.

When the remote evaporator 74 requires a cooling cycle and the host evaporator 52 requires a heating cycle, pilot solenoid PS is energized, switching three-way valve 32 to refrigeration circuit 35, valve HGS is open, valve RHGS is closed, valve RSLS is open, valve LLS is closed, valve SLS is closed, and valve RLLS is open. The refrigerant flow path includes host hot gas line 36, host hot gas line 66, defrost pan heater 68, host evaporator 52, the host suction line to host liquid line by-pass conduit 90 which includes check valve 92, remote liquid line 86, remote expansion valve 72, distributor 73, remote evaporator 74, the remote suction line 84, accumulator 54, and host suction line 60'. Again, the normal condenser function 38 is by-passed, with the heat picked up in the cooling remote evaporator 74 being added to the heating of the host evaporator 74.

I claim:

1. In a transport refrigeration system for a trailer having first and second compartments, including a host refrigeration system which includes a compressor, a condenser, a local evaporator for the first compartment, and hot gas, liquid and suction lines, a remote refrigeration system having an evaporator for the second compartment, and remote hot gas, liquid and suction lines connected to the host refrigeration system, a unidirectional remote suction line to remote liquid line by-pass line, controllable valve means for selectively blocking the host hot gas and liquid lines and the remote hot gas, liquid and suction lines, and electrical control for controlling said valve means to maintain predetermined temperatures in the first and second compartments via cooling and hot gas heating cycles, the improvement comprising:

controllable valve means for selectively blocking the host suction lines, a unidirectional host suction line to host liquid line by-pass line, a check valve in each of the host and remote suction lines, to prevent the associated evaporator from receiving refrigerant when inactive while the other evaporator is active, and means associated with the electrical control means for operating selected ones of the controllable valve means such that either the host evaporator or the remote evaporator may be operated at a lower temperature than the other evaporator, with the host and remote suction lines being respectively closed and open when the host is heating while the remote is cooling, utilizing the host suction line to host liquid line by-pass line in the refrigerant circuit, such that the host condenser is by passed and the host evaporator functions as a condenser for the remote evaporator, and with the host and remote suction lines being respectively open and closed when the host is cooling while the remote is heating, utilizing the remote suction line to remote liquid line by-pass line in the refrigerant circuit, such that the host condenser is by passed and the remote evaporator functions as a condenser for the host evaporator.

2. In the transportation system of claim 1, including means associated with the control means for automatically preventing a heat cycle in either the host or the remote evaporator, responsive to the host or remote evaporator controlling to a temperature indicative of a frozen cargo in the associated compartment.

* * * * *